Jan. 25, 1955
R. W. LEE
2,700,762
RADAR SYSTEM
Filed Dec. 1, 1944
4 Sheets-Sheet 1
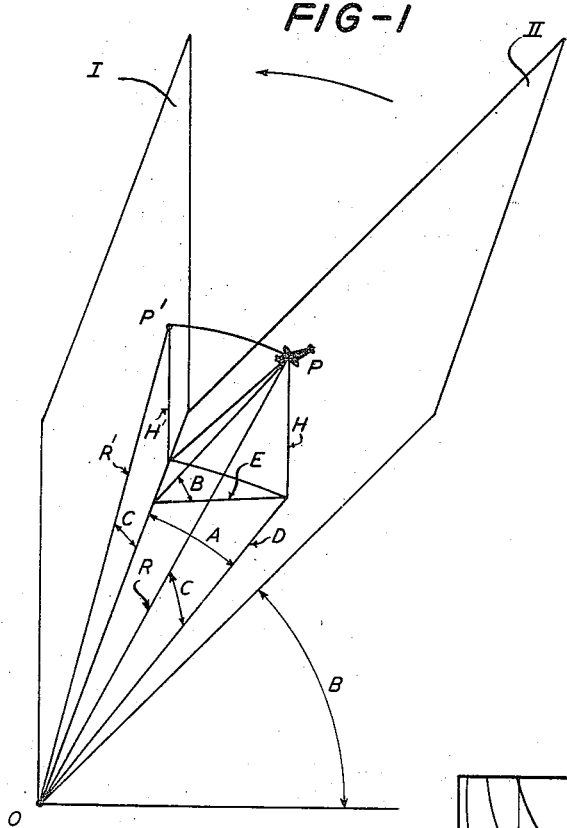
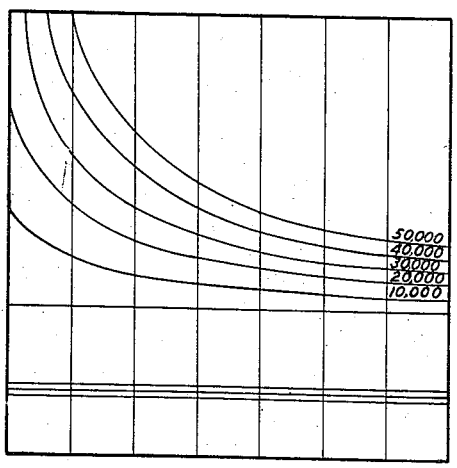
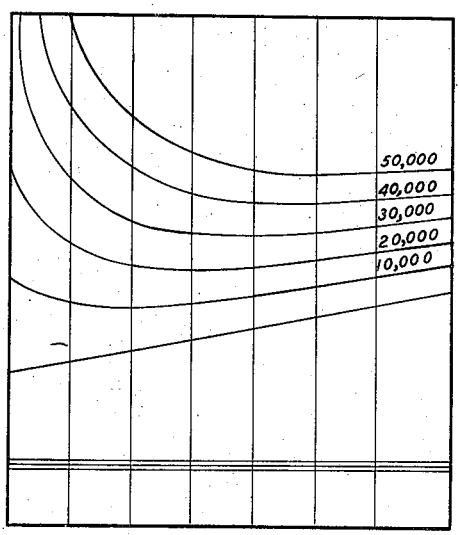
INVENTOR.
RICHARD W. LEE
BY William D. Hall
Attorney Jan. 25, 1955   R. W. LEE   2,700,762
RADAR SYSTEM
Filed Dec. 1, 1944   4 Sheets-Sheet 2
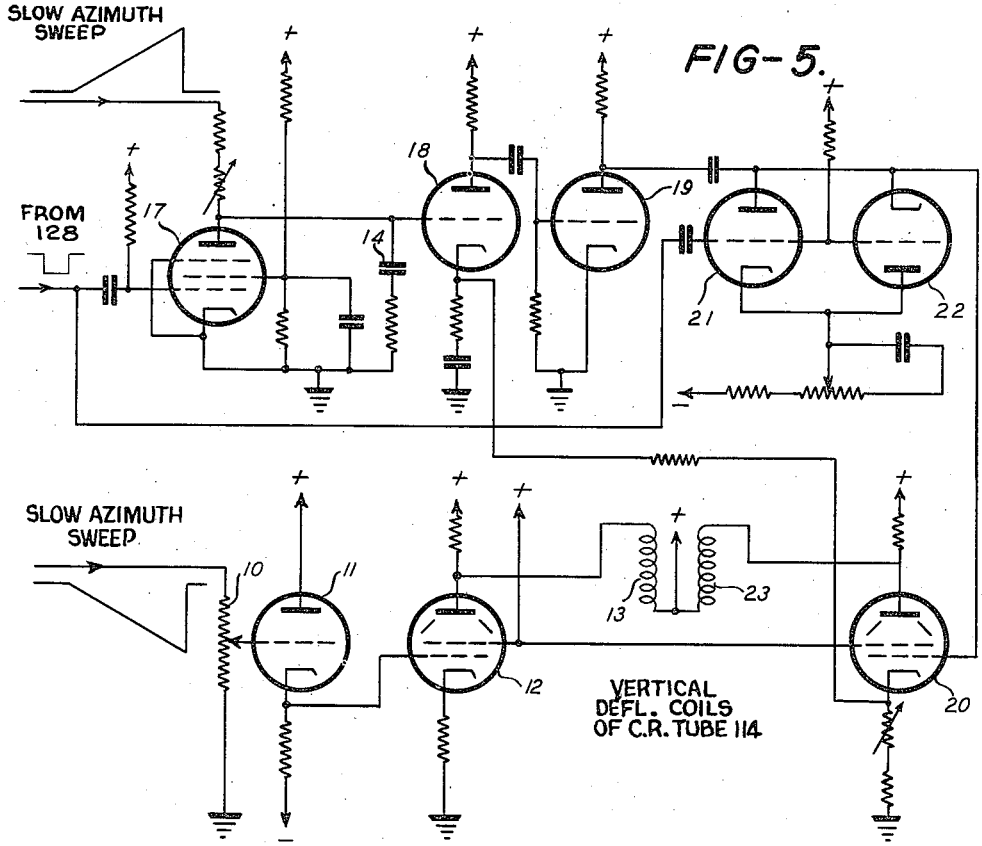
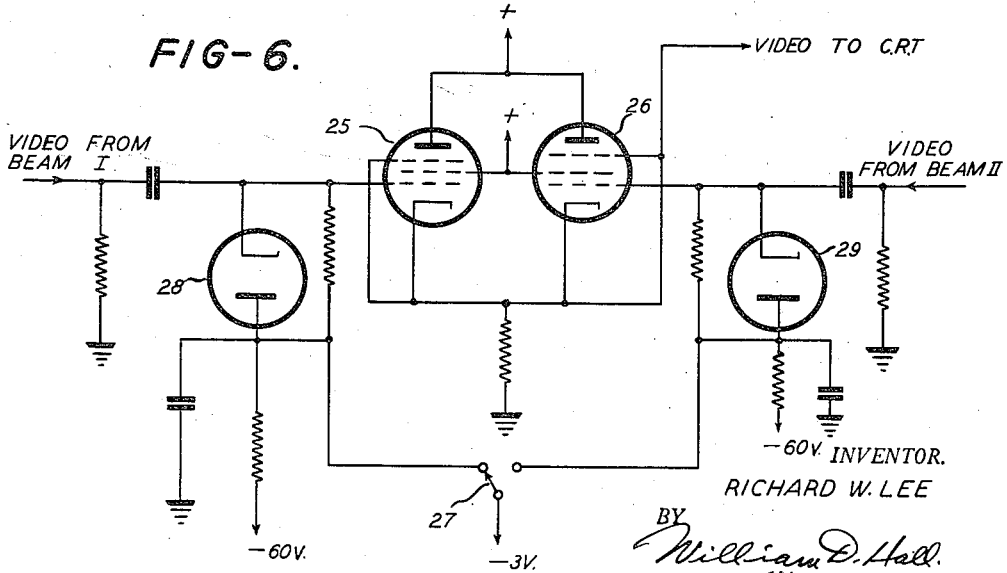
INVENTOR.
RICHARD W. LEE
BY
William D. Hall.
Attorney Jan. 25, 1955  R. W. LEE  2,700,762
RADAR SYSTEM
Filed Dec. 1, 1944  4 Sheets-Sheet 3
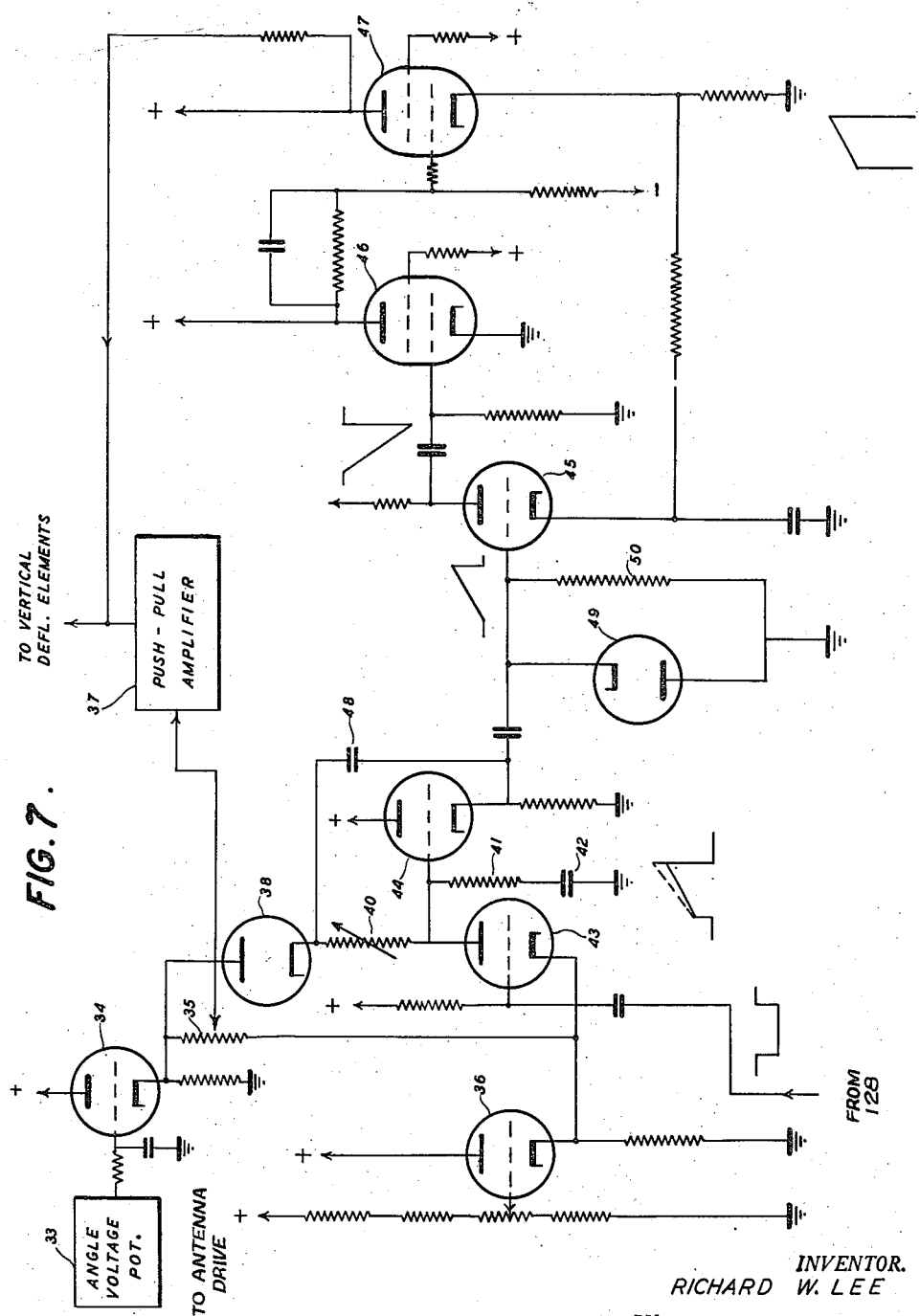
INVENTOR.
RICHARD W. LEE
BY
William D. Hall
Attorney

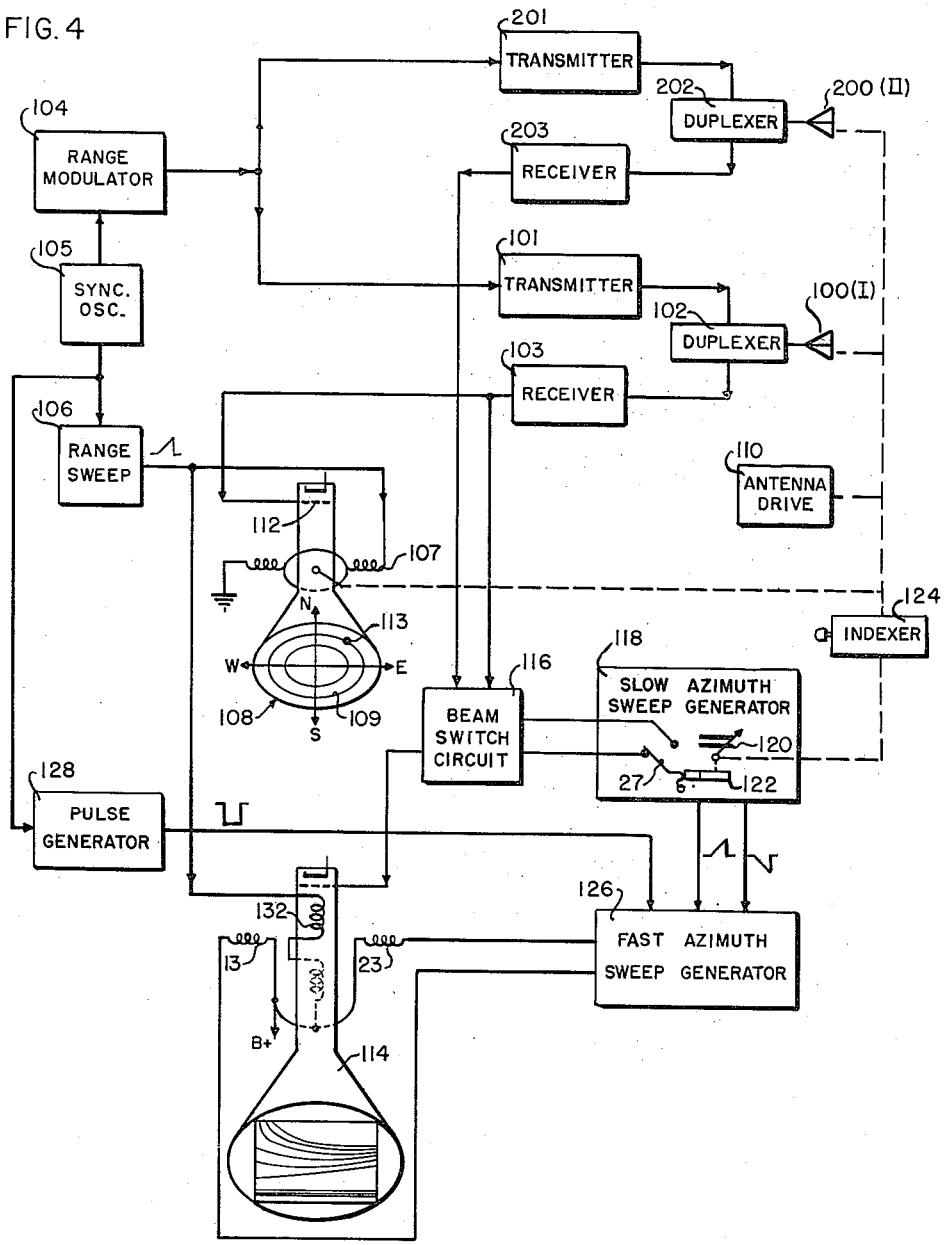

United States Patent Office 2,700,762
Patented Jan. 25, 1955

2,700,762

RADAR SYSTEM

Richard W. Lee, Watertown, Mass., assignor, by mesne assignments, to the United States of America as represented by the Secretary of War Application December 1, 1944, Serial No. 566,164

6 Claims. (Cl. 343—11)

This invention relates to radio object-locating systems and particularly to a means adapted for use in conjunction with radio V-beam scanning apparatus for determining the range and height of aircraft or the like.

The V-beam scanning apparatus forming part of this invention comprises two discrete, divergent beams which intersect along a line which is substantially parallel to the earth's surface or tangent thereto. Both beams have sheet-like or fan-shaped radiation patterns; i. e., the radiation patterns are relatively narrow in azimuth and broad in elevation. One of the beams is preferably perpendicular to the earth's surface, while the other of said beams is inclined with respect to the earth's surface, whereby the azimuthal separation between the respective beams is proportional to the altitude and, in the ideal case, independent of the distance from the source. However, in practice, each beam tends to diverge, whereby the azimuthal separation of said beams tends to decrease with altitude.

Apparatus for forming V-beams is well known in the art, and, since it does not per se constitute a part of the present invention, it need not be described in detail. Beams of this type can be formed by means of a dipole situated at the focus of a paraboloidal reflector, as disclosed in Lyman Patent No. 2,231,929. Such beams can also be formed by linear horn arrays. Design data for dipole or horn arrays can be found in Terman's Radio Engineers' Handbook. Other methods of producing such beams are disclosed in the copending application of Andrew Longacre identified below.

V-beam scanning methods such as are disclosed, for example, in the copending application of Andrew Longacre, Serial No. 566,162, filed December 1, 1944, are adapted to furnish information to radio object-locating equipment regarding the range and azimuth of a target and, in addition thereto, data concerning the angular separation, in azimuth degrees, of the two component beams at the height of the target. Inasmuch as the angular separation is a function of the target height, the interval between echo signals reflected from the two incident beams as they successively impinge upon the target is, for any given range, a measure of the height. The height-finding equipment may therefore be calibrated to indicate height according to the intervals between the echo signals at the various ranges.

At long ranges, due to the geometry of the system, there are smaller intervals between the successive echo signals than would be the case at shorter ranges for the same height of target. This tends to make the calibration unduly critical at long range and thus introduces a possibility of error in the height determination. An object of this invention is to afford a degree of accuracy at long range which is comparable with that obtained at the shorter ranges.

More specifically, it is an object of this invention to so arrange the indicator sweep circuits that the azimuth scale is a function of the range coordinate, the interrelation being such that the height of the target may be determined conveniently from the intervals between the paired echo signals at all ranges, and an unduly high precision of measurement is not required at the longer ranges. A further object is to provide a range-height indicator of simple and novel character. Other and further novel features and advantages will be apparent in the following disclosure and in the claims appended thereto.

In the drawings:

Fig. 1 is a diagram illustrating various geometrical relationships involved in the determination of target height;

Figs. 2 and 3 are elevational views of indicating devices which may be utilized to read the height directly from the echo images of the target on a viewing screen, Fig. 3 contemplating the improvements effected by the present invention;

Fig. 4 is a block diagram of a V-beam system incorporating my invention;

Fig. 5 is a schematic wiring diagram of a sweep circuit embodying the invention;

Fig. 6 is a schematic wiring diagram of a video switching arrangement; and

Fig. 7 is a schematic wiring diagram of an alternative form of sweep circuit.

The geometrical relationships involved in range-height determination will be explained with reference to Fig. 1. Search scanning is performed through the medium of two substantially plane beams of radiant energy, I and II, originating at the source of energy O. The beam I is vertical so that it may serve a dual purpose in plan position indication (P. P. I.) and in the determination of height. The beam II is inclined with respect to the vertical at any suitable angle, such as 45°. The beams are rotated in unison about a vertical axis extending through the source O, beam I preferably being in the lead. It will be assumed for present purposes that the two beams meet at the earth's surface, although in practice they are generally separated in azimuth at their bases.

P represents a target such as an aircraft whose range, azimuth and height are to be determined. The beam I impinges upon the target P at the point of incidence P' in the plane of this beam, whereupon an echo signal is reflected back to the radio object locating apparatus at O. Thereafter the beam II impinges on the target P and a second echo signal is reflected back. The points of incidence P and P' in the planes of the beams II and I, respectively, are separated in azimuth by an angle A. Due to the angular divergence of the beams the magnitude of the azimuth angle A varies with the height of the aircraft, and for any given range the angle A is a measure of the target height.

The mathematical relation between the height H, range R and angle A may be analyzed in the following manner. First, it will be considered that:

$$H = R \sin C = R \frac{\tan C}{\sqrt{1+\tan^2 C}}$$

where C is the angle of elevation subtended by the range line R from the radiant beam source O to the target P.

Tan C in the above equation may be expressed in terms of B (the angle between beam II and the horizontal) and the angle A, which has been defined hereinabove, thus:

$$\tan C = \tan B \sin A$$

This identity may be proved by considering that $$\tan B = \frac{H}{E}$$

where E is the base of a right triangle, the other two sides of which comprise the perpendicular H from point P to the earth's surface and another perpendicular extending from P in the plane of beam II to the base of this beam; and $$\sin A = \frac{E}{D}$$

where D is the hypotenuse of a right triangle, the other two sides of which comprise the line E and the portion of the base of the beam II extending from this line back to the beam source O. Therefore:

$$\tan B \sin A = \frac{H}{E} \times \frac{E}{D} = \frac{H}{D} = \tan C$$

If B is 45°, tan $B=1$ and tan $C=\sin A$. Hence, $$H = R \frac{\sin A}{\sqrt{1+\sin^2 A}}$$

In practice the beams I and II may be separated in azimuth by a fixed angle of lag, as disclosed in the aforesaid Longacre application. Under these conditions:

$$H = R \frac{\sin(F-L)}{\sqrt{1+\sin^2(F-L)}}$$

where F is the total azimuth angle between the points of incidence P and P', Fig. 1, and L is the lag angle.

The indicator employed in the present system includes a cathode ray tube having both range and azimuth sweeps, with range as abscissa and azimuth as the ordinate. Echo images produced by the beams I and II appear on the viewing screen of the indicator in vertically aligned relation and spaced apart in an amount corresponding to the azimuth angle separating the points P and P' (Fig. 1). To use this information in the determination of the height of the target, the face of the cathode ray tube is provided with an indicating device comprising a transparent sheet of plastic upon which is ruled: (1) a line that can be centered over the lower target image, and (2) a family of curves representing various constant values of target height. The position of the upper image in relation to these curves indicates target height.

For a constant height H the magnitude of the angle A diminishes the greater the range R of the target, as can be seen from the equations developed hereinabove. Therefore, the family of curves tends to become crowded at the long-range end of the graph, as shown in Fig. 2. It is desirable that the curves of constant height be given greater spread at the long-range end of the graph, somewhat as indicated in Fig. 3. This entails expansion of the azimuth sweep scale as the range coordinate increases.

Apparatus for accomplishing such expansion of the azimuth sweep scale is illustrated diagrammatically in Fig. 5. The circuits illustrated therein function to provide a series of fast azimuth sweeps of gradually increasing slope superimposed upon a uniform slow azimuth sweep. The fast azimuth sweeps are coordinated with the range sweeps of the indicator while the slow azimuth sweep is synchronized with the rotation of the antenna mount.

Reference is now made to Fig. 4 which shows a block diagram of a complete V-beam system incorporating the present invention. Antennas 100 and 200 are adapted to produce the flat vertical and inclined beams I and II, respectively. As was mentioned above, the antenna 100 may also constitute part of a conventional P. P. I. system which also includes a radio pulse transmitter 101 and receiver 103, both coupled to antenna 100 through a duplexer 102, which is a well-known electronic network for alternately coupling the antenna to the transmitter and receiver. Transmitter 101 is normally blocked, but it periodically made operative for short spaced intervals by a pulse modulator 104 which generates pulses of short duration spaced at intervals of considerably longer duration, under the control of a sine-wave synchronizing oscillator 105 operating in the audio frequency region.

Oscillator 105 also controls a saw-tooth wave generator 106, the output of which is applied to the deflecting coil 107 of a cathode ray tube 108 so that the beam thereof is periodically deflected radially in synchronism with the transmission of each radio pulse, whereby the radial sweep forms a time base which can be graduated in terms of distance by means of circular graduations 109 on the screen of the tube.

Deflecting coil 107 is rotatable in synchronism with the rotation of the antennas, both of which are continuously rotated in azimuth by antenna drive 110, whereby the plane of radial deflection of the beam of the cathode ray tube always corresponds to the azimuthal position of the plane of antenna 100.

The intensity grid 112 of the tube is normally biased so as to considerably dim or entirely suppress the beam. The received echo output of receiver 103 renders intensity grid 112 more positive so that the received echo is indicated as a bright dot or arc 113, the radial distance of which, from the center of the screen, is a measure of the distance of the reflecting object in space, and the angular position of which is a measure of the azimuth of the reflected object when it is scanned by the beam of antenna 100 (beam I).

The inclined beam 200 forms with the antenna 100 of the above described P. P. I. system, a V-beam system. Connected to antenna 200 are a transmitter 201, a receiver 203, and a duplexer 202, which are similar in function and structure to components 101, 103 and 102, respectively. Transmitter 201 is periodically pulsed by modulator 104 (although a separate modulator can be used) so that both antennas simultaneously transmit pulses of like duration and separation.

The echoes received on antennas 100 and 200 are successively applied to the intensity grid of altitude-indicating cathode ray tube 114, the screen of which is represented in greater detail in Figs. 2 and 3. This is done under the control of a beam-switching circuit 116, shown in detail in Fig. 6 to be described hereinafter, which successively switches the outputs of receivers 103 and 203 to the intensity grid as the antenna beams successively hit the target.

A slow azimuth-sweep is provided by a generator 118 having a rotating condenser 120 coupled to the antenna drive 110 through an adjustable shaft-indexing means 122. Generator 118 generates two oppositely phased saw-tooth voltages, the instantaneous amplitudes of which are proportional to the azimuthal orientation of antenna 100. A cam 124 is also attached to the condenser shaft to operate a switch 27 which controls the beam-switching circuit 116. By adjustment of indexer 124, the start of the azimuth sweep voltages in generator 118 and the time of operation of cam switch 27 can be adjusted to occur at any desired position of the antennas.

The outputs of sweep generator 118 are applied to the stationary, vertical deflecting coils 13 and 23 through a fast-azimuth sweep circuit 126 which superimposes upon the slow azimuth sweep, a sweep-expanding component which is a function of the range of the target. This range function is provided by a negative square wave impressed upon circuit 126 from a pulse generator 128, which is controlled by synchronizing oscillator 105 so that said square wave is synchronized with the range sweep.

The range sweep of tube 114 is provided by the output of a range sweep generator 106 impressed upon the stationary horizontal deflecting coil 132. Thus, reflecting targets are indicated by dots upon the screen of tube 114. The position of said dots along the horizontal coordinate is proportional to the range of the target, while their position along the vertical coordinate is dependent upon the azimuth of the target.

In producing the slow azimuth sweep a linear voltage proportional to the azimuth position of the scanning beam I is developed by a rotating condenser 122 of slow-azimuth sweep generator 118 and is applied to the fast azimuth-sweep circuit 126, shown in detail in Fig. 5. In this circuit, the negative going saw-tooth wave from circuit 118 is applied through a potentiometer 10 to the grid of a tube 11, which is included in a cathode follower circuit. After passing through the cathode follower tube 11, the sweep voltage is amplified by a power tube 12 and is applied to a vertical deflecting coil 13 of the cathode ray tube in the indicator.

The range sweep of the indicator is obtained by applying a suitable linear sweep voltage from sweep generator 106 to the horizontal deflecting coils 132, preferably through a conventional gating means to control the application of the sweep voltage to these horizontal deflectors. (It will be understood that the apparatus could be adapted to the use of deflecting plates rather than coils, if desired.)

The positive going voltage proportional to azimuth from slow azimuth sweep generator 118 is also applied to a resistance-capacitance network including the condenser 14, which is part of a sawtooth voltage generating circuit. A switch tube 17 is normally effective to shunt a portion of the resistance-capacitance network including the condenser 14. The negative gate from square wave generator 128 which is synchronized with the range sweep of the indicator is applied to the grid of the switch tube 17 periodically, thereby cutting this tube off and removing the shunt from the condenser 14. As this condenser charges, a sawtooth voltage pulse is built up and is passed successively through tubes 18, 19 and 20, which are embodied in a degenerative feedback amplifier circuit. This amplified pulse affords the fast azimuth sweep which is applied to a vertical deflecting coil 23 of the cathode ray tube, thereby effectively superimposing the fast azimuth sweep upon the slow azimuth sweep produced by the deflecting coil 13. Clamping tubes 21 and 22 are inserted between the amplifier stages 19 and 20 to insure restoration of the voltage to a predetermined level between the fast azimuth sweeps, these clamping tubes being gated in synchronism with the switch tube 17.

The slope of the fast azimuth sweep increases in each successive excursion of the cathode ray beam by reason of the fact that the charging voltage impressed upon the condenser 14 increases as the slow azimuth sweep progresses. Therefore, the long-range ends of the cathode ray beam traces are given increasingly greater divergence vertically on the viewing screen of the indicator due to application of the fast azimuth sweep. This has the effect of enabling a greater spread of the constant-height curves on the long-range (right-hand) portion of the indicating device, as shown in Fig. 3, than would be the case if a fast azimuth sweep were not employed.

Range and azimuth information are obtained from the P. P. I. scope receiving signals from the beam I. The starting point of the slow azimuth sweep in the range-height indicator 114 may be selected by the operator, who sets the zero azimuth position of this indicator to coincide with the azimuth position of the target. The vertical sweep on the range-height indicator has a 5° pre-start in azimuth so that the target image produced by beam I appears about 5° from the bottom of the picture. In obtaining the echo images from both beams, the video input to the range-height indicator is switched from beam I to beam II shortly after an echo is received from the beam I. In practice, the beams I and II are separated at their bases by an azimuth angle of about 10° as a means of avoiding confusion of the echoes from low-flying aircraft. The beam-sweep circuit 116 illustrated in Fig. 6 is provided to switch beams at the 10° point in the azimuth sweep.

Referring to Fig. 6, the video signal from beam I is applied to an amplifier tube 25 and the video signal from beam II is applied to an amplifier tube 26, the tubes 25 and 26 being arranged in parallel in a common cathode follower circuit, the output of which is fed to the beam intensifying element of the cathode ray tube. The tubes 25 and 26 are alternatively biased to cutoff by cam switch 27 which is controlled by the shaft of rotating condenser 120 that originates the slow azimuth sweep. When the switch is in the left-hand position as shown, the tube 26 is biased to cutoff and only the video signals from the vertical beam I are applied to the indicator. When the antenna mount traverses 10° (the angle of lag between the two beams) from the selected zero azimuth position, a cam throws the switch 27 to the right, as viewed in Fig. 6, so that the tube 25 is cut off and only the signals from the inclined beam II are applied to the indicator. Clamping diodes 28 and 29 effect restoration of the grid voltages to a predetermined level between signals.

As a result of the aforesaid operations the target image appears in two places on the picture. The fact that the two signals come from the same target is established if the two images lie in a vertical line, that is, have the same range. The chart or overlay (Fig. 3) may then be utilized to ascertain the target height from the spacing of the two images. Range of the target may be determined by reference to suitable range lines on the overlay. If desired, a correction factor may be included to take care of the earth's curvature.

An alternative form of circuit for providing fast and slow azimuth sweeps is illustrated in Fig. 7. A positive slow azimuth sweep voltage derived from an angle voltage potentiometer 33, driven by the antenna drive, is impressed upon the grid of a cathode follower tube 34. A potentiometer 35 is connected between the cathode of the tube 34 and the cathode of a tube 36, which is embodied in another cathode follower circuit. The slow azimuth sweep voltage taken from the potentiometer 35 is fed through a push-pull amplifier 37 and thence to the vertical deflecting elements of the cathode ray tube of the indicator. A variable positive bias is applied to the grid of the tube 36 for a purpose which will be explained presently.

The output voltage of the cathode follower 34 is also applied in parallel through a diode 38 to a resistance-capacitance network including a variable resistor 40, fixed resistor 41 and condenser 42. These elements are embodied in a sawtooth voltage generating circuit which provides the fast azimuth sweep. A switch tube 43 is arranged in series with the diode 38 and variable resistor 40, and is normally effective to shunt the resistor 41 and condenser 42. The cathode bias of this switch tube is controlled by the cathode follower 36. A negative gate applied periodically to the grid of the switch tube 43 cuts this tube off and enables the condenser 42 to charge. The width of the gate determines the duration of the fast azimuth sweep as well as the period of the indicator range sweep.

The grid bias of the tube 36 is so adjusted that the fast azimuth sweep will commence at a selected value of slow azimuth sweep voltage corresponding to zero azimuth. The time constant of the sawtooth circuit is so adjusted that the initial fast azimuth sweep has a relatively small slope while the succeeding fast azimuth sweeps have increasingly larger slopes due to the gradual increase in the angle voltage which is utilized to charge the condenser 42. All of the sawtooth pulses in the series of fast azimuth sweeps commence at the same value of voltage. As each pulse builds up, the diode 38 is cut off by the rise in potential of its cathode, until the next pulse occurs.

The sawtooth voltage produced by the aforesaid resistance-capacitance network is passed through a cathode follower 44 to a degenerative feedback amplifier having the successive tube stages 45, 46 and 47. A portion of the output voltage of the cathode follower 44 is fed back through a condenser 48 to the sawtooth generating circuit thereby affording a bootstrap effect which improves the linearity of the fast azimuth sweep. A D.-C. restorer or clamping diode 49 connected across the grid leak resistor 50 of the amplifier tube 45 maintains a fixed voltage level intermediate the sawtooth pulses. The last tube 47 of the amplifier is biased below cutoff and is not conductive until the amplified sawtooth voltage is impressed upon its control grid. Thus, the output of this tube is in the form of a triangular pulse which is added to the slow azimuth sweep applied to the vertical deflection elements of the cathode ray tube.

It will be noted from the foregoing description that both of the sweep circuits illustrated in Figs. 5 and 7 are adapted to accomplish expansion of the vertical azimuth sweep at the long-range end of the presentation on the indicator. This enables a certain spread of the constant-height curves on the indicating device, Fig. 3, which would not be realized if no fast azimuth sweep were employed (compare Fig. 3 with Fig. 2). This feature obviates the disadvantageous crowding of the constant-height lines at the long-range ends thereof which would exist if the present invention were not employed.

Inasmuch as the azimuth sweeps, both slow and fast, are controlled by the angle voltage which varies in accordance with the azimuth position of the energy beams, it is not essential that the rotation of these beams take place at a uniform speed. The movement of the cathode ray beam is always accurately correlated with that of the radiant energy beams irrespective of variations in rotative speed. Hence, it is the angular separation (in azimuth degrees) of the points of incidence P and P', rather than the time interval between the echo signals, which determines the vertical spacing of the echo images on the indicator. This feature increases the dependability of the apparatus under actual operating conditions.

It will be understood that variations or additional modifications of this invention may be developed by persons skilled in the art without departing from the spirit of the invention and the scope of the appended claims.

What is claimed is:

1. In a radio object-locating system including a cathode ray tube indicator and which is adapted to find the height of an object through the medium of two distinct beams of radiant energy pulses having a fan-shaped radiation pattern and inclined in elevation relative to each other by a fixed acute angle of substantial magnitude, both beams being rotated in unison about a vertical axis, the combination of: means responsive to echo signals from both said beams to vary the intensity of the beam of said cathode ray tube, means synchronized with each pulse transmission to provide a range sweep along one coordinate of the screen of said tube, means synchronized with both the rotation of said beams and said range sweep to provide an azimuth sweep along a second coordinate of said screen, whereby the azimuth sweep varies as a function of the range-coordinate sweep, and a plurality of indicator lines on the screen of said cathode ray tube, said lines being a family of curves of the azimuth coordinate versus the range coordinate for various values of constant height.

2. In a radio object-locating system including a cathode ray tube indicator and which is adapted to find the height of an object through the medium of two discrete beams of radiant energy pulses both having a fan-shaped radiation pattern and inclined in elevation relative to each other by a fixed acute angle of substantial magnitude, both beams rotating in unison about a vertical axis, the combination of: means responsive to echo signals from both said beams to vary the intensity of the beam of said cathode ray tube, means synchronized with each pulse transmission to provide a range sweep along one coordinate of the screen of said tube, and means synchronized with both the rotation of said beams and said range sweep to provide an azimuth sweep along a second coordinate of said screen, whereby the azimuth sweep varies as a function of the range-coordinate sweep.

3. A radar system comprising antenna means for forming a pair of discrete, divergent beams, both of said beams having fan-shaped radiation patterns, one beam extending perpendicularly to the surface of the earth, the other of said beams being inclined in elevation relative to said one beam by a fixed acute angle of substantial magnitude, means for transmitting pulses of wave energy through said antenna means, receiving means coupled to said antenna means for receiving echoes of said pulses, rotating means for continuously rotating the azimuthal orientation of said antenna means, an oscillator for controlling the transmission of said pulses, a cathode ray oscilloscope having a pair of beam deflecting means respectively adapted to deflect said beam along different coordinates, means controlled by the output of said receiver to vary the intensity of said beam to indicate said echoes upon the screen of said oscilloscope, means under the control of said oscillator to generate a sawtooth wave, means to impress said sawtooth wave upon one of said deflecting means to provide a range sweep on said screen, sweep generating means controlled by said rotating means to generate a pair of sawtooth waves, means controlled by said oscillator and the other of said pair of sawtooth waves to generate a sawtooth wave having a progressively increasing rate of rise, and means to impress last-named sawtooth wave upon said other deflecting means.

4. In a radio pulse echo locating system for finding the range and height of an object by simultaneously transmitting two discrete beams of radiant energy pulses both having a fan-shaped radiation pattern, one beam lying in a vertical plane and the other beam lying in a plane inclined in elevation relative to said vertical plane by a fixed acute angle of substantial magnitude, said two beams being angularly separated relative to each other in a horizontal plane by a predetermined amount of azimuth lag, and said two beams being rotated in unison about a vertical axis; said system including a cathode ray tube indicator having elements for intensity modulating the electron beam thereof, elements for deflecting the electron beam thereof along a first rectangular coordinate and elements for deflecting said electron beam along a second rectangular coordinate; the combination comprising means for generating a sawtooth periodic range signal in synchronism with the transmission of said pulses, means for applying said range signal to said first coordinate deflecting elements for effecting a range sweep along said first coordinate, means synchronized with the rotation of said beams for generating an azimuth signal substantially proportional in magnitude to the angular displacement in azimuth of said one beam relative to a given azimuthal direction, means for applying said azimuth signal to said second coordinate deflecting elements for effecting an azimuth sweep along said second coordinate, first means for receiving echoes of transmitted pulses of said one beam, second means for receiving echoes of transmitted pulses of said other beam, switching means intermediate said electron beam intensity modulating elements and said first and second receiving means, said switching means in a first position serving to intensity modulate said electron beam in response to the output of said first receiving means, and in a second position thereof serving to intensity modulate said electron beam in response to the output of said second receiving means, means coupled intermediate said azimuth signal generating means and said switching means for maintaining said switching means in the first position thereof while said azimuth signal is below a predetermined value and in the second position thereof while said azimuth is above said predetermined value, said predetermined value being proportional to said azimuth lag, and means for setting said given azimuthal direction in the azimuthal direction of a given object, whereby two presentations of said given object are displayed on said indicator, both presentations having the same range coordinates and different azimuth coordinates, the height of said given object being a function of the difference in said azimuth coordinates.

5. The combination according to claim 4, further including an overlay over the face of said indicator, said overlay having a base line and a family of constant height curves, whereby the difference in said azimuth coordinates of said given object may be interpreted directly in terms of height.

6. The combination according to claim 4, further including means coupled to said range signal generating means and said azimuth signal generating means for producing a sawtooth signal having a period in time coincidence with the period of said range signal and a slope proportional to the magnitude of said azimuth signal at the time of occurrence of said range signal, and means for applying said last-named sawtooth signal to said second coordinate deflecting means in additive relationship with respect to said azimuth signal to modify said azimuth sweep, whereby the difference between the azimuth coordinates of said two presentations of said given object is increased at long ranges thereof.

References Cited in the file of this patent

UNITED STATES PATENTS

| | | |
|---|---|---|
| 2,189,549 | Hershberger | Feb. 6, 1940 |
| 2,205,560 | Herzog | June 25, 1940 |
| 2,231,929 | Lyman | Feb. 18, 1941 |
| 2,251,984 | Cleaver et al. | Aug. 12, 1941 |
| 2,312,761 | Hershberger | Mar. 2, 1943 |
| 2,400,791 | Tolson et al. | May 21, 1946 |
| 2,401,432 | Luck | June 4, 1946 |
| 2,409,456 | Tolson et al. | Oct. 15, 1946 |
| 2,412,669 | Bedford | Dec. 17, 1946 |
| 2,419,567 | Labin | Apr. 29, 1947 |
| 2,420,408 | Behn | May 13, 1947 |
| 2,422,295 | Eaton | June 17, 1947 |
| 2,538,800 | Ranger | Jan. 23, 1951 |